«12» United States Patent
Patterson et al.

(10) Patent No.: US 7,478,875 B2
(45) Date of Patent: Jan. 20, 2009

(54) CHILD RESTRAINT SYSTEM AND METHOD FOR MONITORING INSTALLATION OF THE CHILD RESTRAINT SYSTEM

(75) Inventors: James F. Patterson, Greentown, IN (US); Stuart S. Sullivan, Peru, IN (US); Rodney A. Lawrence, Frankfort, IN (US); Duane D. Fortune, Lebanon, IN (US); Edward J. Wallner, Westfield, IN (US); Stephen B. Porter, Noblesville, IN (US); William W. Fultz, Carmel, IN (US); Kevin D. Kincaid, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 433 days.

(21) Appl. No.: 11/147,148

(22) Filed: Jun. 6, 2005

(65) Prior Publication Data
US 2005/0275258 A1 Dec. 15, 2005

Related U.S. Application Data

(60) Provisional application No. 60/607,988, filed on Sep. 8, 2004, provisional application No. 60/577,546, filed on Jun. 7, 2004.

(51) Int. Cl.
*A47C 7/62* (2006.01)
*A47C 1/08* (2006.01)
(52) U.S. Cl. .................. 297/217.3; 297/217.2; 280/735
(58) Field of Classification Search .............. 297/250.1, 297/217.3, 217.2; 280/735; 340/457.1
See application file for complete search history.

(56) References Cited

U.S. PATENT DOCUMENTS

| 4,039,224 | A | | 8/1977 | Bauer et al. |
| 5,174,035 | A | * | 12/1992 | Yamazaki ..................... 33/395 |
| 5,260,684 | A | | 11/1993 | Metzmaker et al. |

(Continued)

FOREIGN PATENT DOCUMENTS

GB 2290505 1/1996

OTHER PUBLICATIONS

Written Opinion of the International Searching Authority dated Oct. 13, 2006 for PCT/US2005/19872.
International Search Report dated Oct. 13, 2006 for PCT/US2005/19872.

*Primary Examiner*—David R Dunn
*Assistant Examiner*—Erika Garrett
(74) *Attorney, Agent, or Firm*—Douglas D. Fekete

(57) ABSTRACT

A child restraint system and a method for monitoring installation of the child restraint system are provided. The child restraint system includes a child seat configured to receive a child occupant. The child restraint system further includes a first sensor coupled to the child seat. The first sensor is configured to output a first signal indicative of positional angle of the child seat relative to a first axis. The child restraint system further includes a controller coupled to the child seat configured to receive the first signal and to calculate a first angle value based on the first signal. The controller is further configured to induce a first device disposed on the child seat to indicate when the first angle value is not within a predetermined angular range from the first axis.

24 Claims, 9 Drawing Sheets

U.S. PATENT DOCUMENTS

| | | | |
|---|---|---|---|
| 5,454,591 A | 10/1995 | Mazur et al. | |
| 5,581,234 A * | 12/1996 | Emery et al. | 340/457.1 |
| 5,656,994 A | 8/1997 | Heninger | 340/457.1 |
| 5,711,574 A | 1/1998 | Barnes | 297/216.11 |
| 5,720,519 A * | 2/1998 | Barnes | 280/735 |
| 5,758,737 A | 6/1998 | Brown et al. | |
| 5,833,311 A | 11/1998 | Friedrich et al. | |
| 5,965,827 A | 10/1999 | Stanley et al. | |
| 5,984,349 A | 11/1999 | Van Voorhies | |
| 6,037,860 A * | 3/2000 | Zander et al. | 340/436 |
| 6,151,540 A | 11/2000 | Anishetty | 701/45 |
| 6,203,059 B1 | 3/2001 | Mazur et al. | |
| 6,246,936 B1 | 6/2001 | Murphy et al. | 701/45 |
| 6,255,790 B1 * | 7/2001 | Popp et al. | 318/280 |
| 6,259,042 B1 | 7/2001 | David | |
| 6,264,236 B1 | 7/2001 | Aoki | |
| 6,272,936 B1 | 8/2001 | Oreper et al. | 73/862.621 |
| 6,356,187 B2 | 3/2002 | Jinno et al. | |
| 6,364,352 B1 * | 4/2002 | Norton | 280/735 |
| 6,371,516 B1 | 4/2002 | Miyagawa | 280/735 |
| 6,382,667 B1 | 5/2002 | Aoki | |
| 6,438,476 B1 | 8/2002 | Gray et al. | 701/45 |
| 6,459,973 B1 | 10/2002 | Breed et al. | |
| 6,463,372 B1 | 10/2002 | Yokota et al. | |
| 6,480,616 B1 * | 11/2002 | Hata et al. | 382/106 |
| 6,490,936 B1 | 12/2002 | Fortune et al. | |
| 6,502,860 B1 | 1/2003 | Seigfried et al. | |
| 6,517,106 B1 * | 2/2003 | Stanley et al. | 280/735 |
| 6,529,381 B1 | 3/2003 | Schoenfish | |
| 6,554,318 B2 | 4/2003 | Kohut et al. | 280/801.1 |
| 6,578,871 B2 | 6/2003 | Gray et al. | 280/735 |
| 6,587,770 B1 | 7/2003 | Gray et al. | 701/45 |
| 6,595,545 B2 | 7/2003 | Curtis et al. | |
| 6,605,877 B1 | 8/2003 | Patterson et al. | 307/10.1 |
| 6,644,689 B2 | 11/2003 | Murphy | 280/735 |
| 6,650,978 B1 | 11/2003 | Patterson et al. | 701/35 |
| 6,662,094 B2 | 12/2003 | Murphy et al. | 701/45 |
| 6,683,534 B2 | 1/2004 | Patterson et al. | 340/436 |
| 6,715,830 B2 * | 4/2004 | Alexy | 297/250.1 |
| 6,749,038 B2 | 6/2004 | Sullivan et al. | 180/268 |
| 6,796,192 B2 | 9/2004 | Sullivan et al. | 73/862.391 |
| 6,812,844 B1 | 11/2004 | Burgess | 340/573.1 |
| 6,818,842 B2 | 11/2004 | Gray et al. | 177/144 |
| 6,847,302 B2 | 1/2005 | Flanagan et al. | 340/666 |
| 6,850,825 B2 | 2/2005 | Murphy et al. | 701/45 |
| 6,851,503 B2 | 2/2005 | Almaraz et al. | 180/268 |
| 6,854,415 B2 | 2/2005 | Barnes et al. | 116/67 R |
| 6,863,286 B2 | 3/2005 | Eros et al. | |
| 6,868,745 B2 | 3/2005 | Sullivan et al. | 73/862.391 |
| 6,889,146 B2 | 5/2005 | Sullivan et al. | 702/43 |
| 6,958,451 B2 * | 10/2005 | Breed et al. | 177/1 |
| 7,004,541 B2 | 2/2006 | Sedlack | |
| 7,021,709 B2 | 4/2006 | Dolan et al. | |
| 7,134,687 B2 * | 11/2006 | Breed et al. | 280/735 |
| 2004/0113634 A1 | 6/2004 | Stanley et al. | |
| 2004/0113797 A1 | 6/2004 | Osborne | |
| 2005/0026499 A1 | 2/2005 | Choi | |
| 2005/0030188 A1 | 2/2005 | Flanagan et al. | 340/667 |
| 2005/0092539 A1 | 5/2005 | Chitalia et al. | |
| 2005/0121956 A1 | 6/2005 | Dolan | |
| 2005/0189805 A1 | 9/2005 | Burley et al. | |
| 2005/0194779 A1 | 9/2005 | Ito et al. | |
| 2005/0275276 A1 | 12/2005 | Patterson | |

\* cited by examiner

CHILD RESTRAINT SYSTEM AND METHOD FOR MONITORING INSTALLATION OF THE CHILD RESTRAINT SYSTEM

CROSS REFERENCE TO RELATED APPLICATIONS

The application claims the benefit of U.S. Provisional application, Ser. No. 60/577,546, filed Jun. 7, 2004, the contents of which are incorporated herein by reference thereto.

The application also claims the benefit of U.S. Provisional application, Ser. No. 60/607,988, filed Sep. 8, 2004, the contents of which are incorporated herein by reference thereto.

This application is also related to the following U.S. patent applications filed contemporaneously herewith: CHILD SEAT AND MONITORING SYSTEM, Ser. No. 11/146,927; CHILD SEAT AND MONITORING SYSTEM, Ser. No. 11/146,928; CHILD SEAT MONITORING SYSTEM AND METHOD FOR DETERMINING A TYPE OF CHILD SEAT, PCT/US05/20046; CHILD RESTRAINT SYSTEM AND METHOD FOR MONITORING INSTALLATION OF THE CHILD RESTRAINT SYSTEM, Ser. No. 11/146,926; CHILD RESTRAINT SYSTEM COMPRISING WEIGHT SENSOR, Ser. No. 11/146,921; CHILD RESTRAINT SYSTEM COMPRISING CONTROL UNIT FOR EVALUATING HARNESS ADJUSTMENT, Ser. No. 11/147,149. The contents of which are each incorporated herein by reference thereto.

TECHNICAL FIELD

This application relates to a child restraint system and a method for monitoring installation of the child restraint system.

BACKGROUND

Child restraint systems have been utilized to hold infants or children therein within vehicles. One type of child restraint system includes a child seat and a base portion for holding the seat, that are rearward-facing with respect to a vehicle seat. A second type of child restraint system utilizes a rearward-facing child seat without the base portion. A third type of child restraint system is a booster child seat that is frontward-facing with respect to the vehicle seat.

During installation of any of the foregoing types of child restraint systems in a vehicle, an orientation of the child seat relative to a vertical axis should be maintained within a predetermined angular range from the vertical axis, to minimize and/or prevent neck injuries to children.

Accordingly, the inventors herein have recognized a need for a child restraint system that can indicate whether a child seat has been installed at a proper positional angle on the vehicle seat.

SUMMARY

A child restraint system adapted to be mounted within a vehicle in accordance with an exemplary embodiment is provided. The child restraint system includes a child seat configured to receive a child occupant. The child restraint system further includes a first sensor coupled to the child seat. The first sensor is configured to output a first signal indicative of positional angle of the child seat relative to a first axis. The child restraint system further includes a controller coupled to the child seat configured to receive the first signal and to calculate a first angle value based on the first signal. The controller is further configured to induce a first device disposed on the child seat to indicate when the first angle value is not within a predetermined angular range from the first axis.

A method for monitoring installation of a child restraint system on a vehicle seat in accordance with another exemplary embodiment is provided. The child restraint system has a child seat configured to receive a child occupant. The method includes outputting a first signal from a first sensor disposed on the child seat. The first signal is indicative of a positional angle of the child seat relative to a first axis. The method further includes calculating a first angle value based on the first signal utilizing a controller. The method further includes inducing a first device disposed on the child seat to indicate when the first angle value is not within a predetermined angular range from the first axis.

DESCRIPTION OF EXEMPLARY EMBODIMENTS

Figure 1:
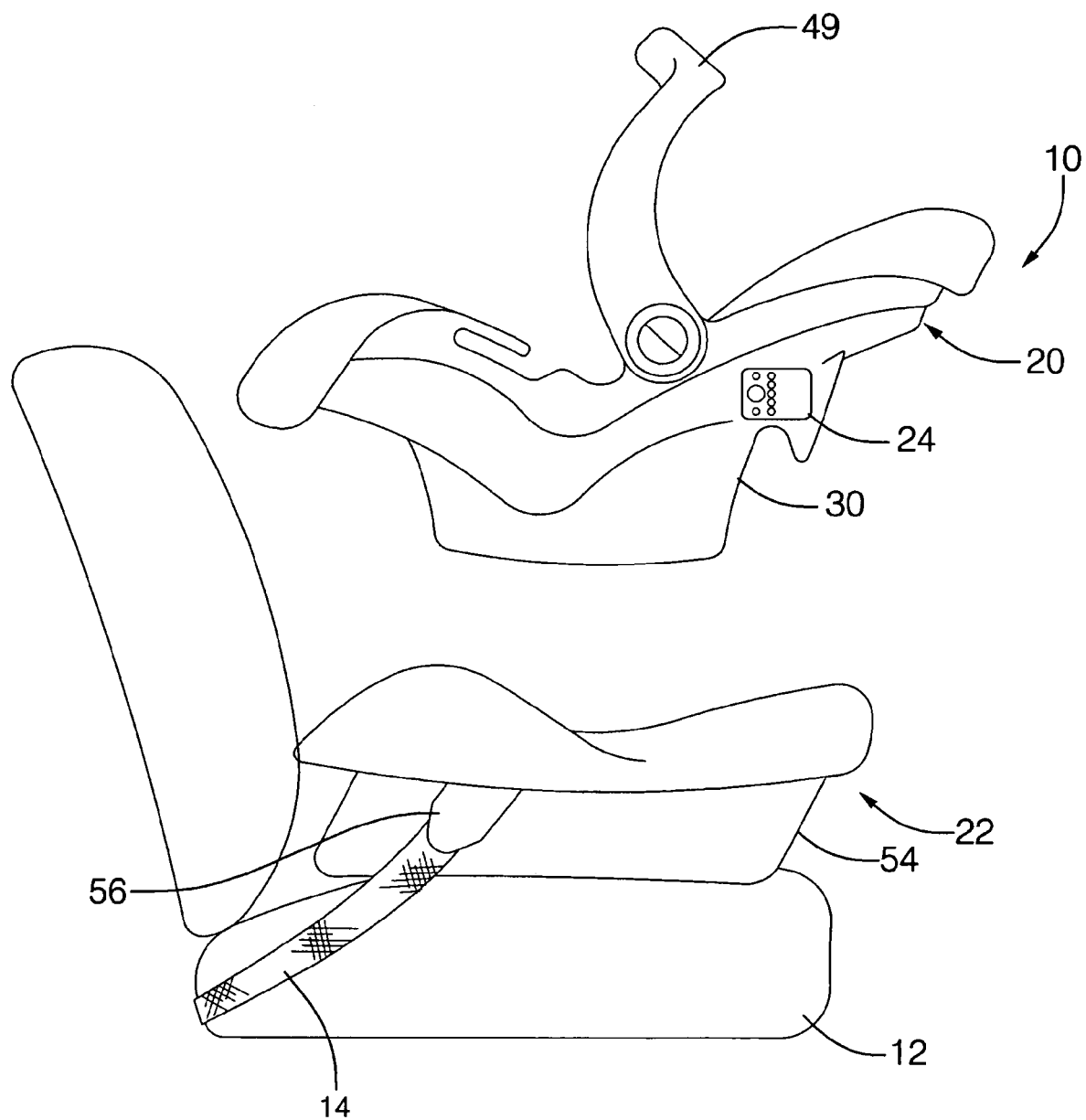
FIG. 1 is a diagram of a child restraint system in accordance with an exemplary embodiment.
Figure 4:
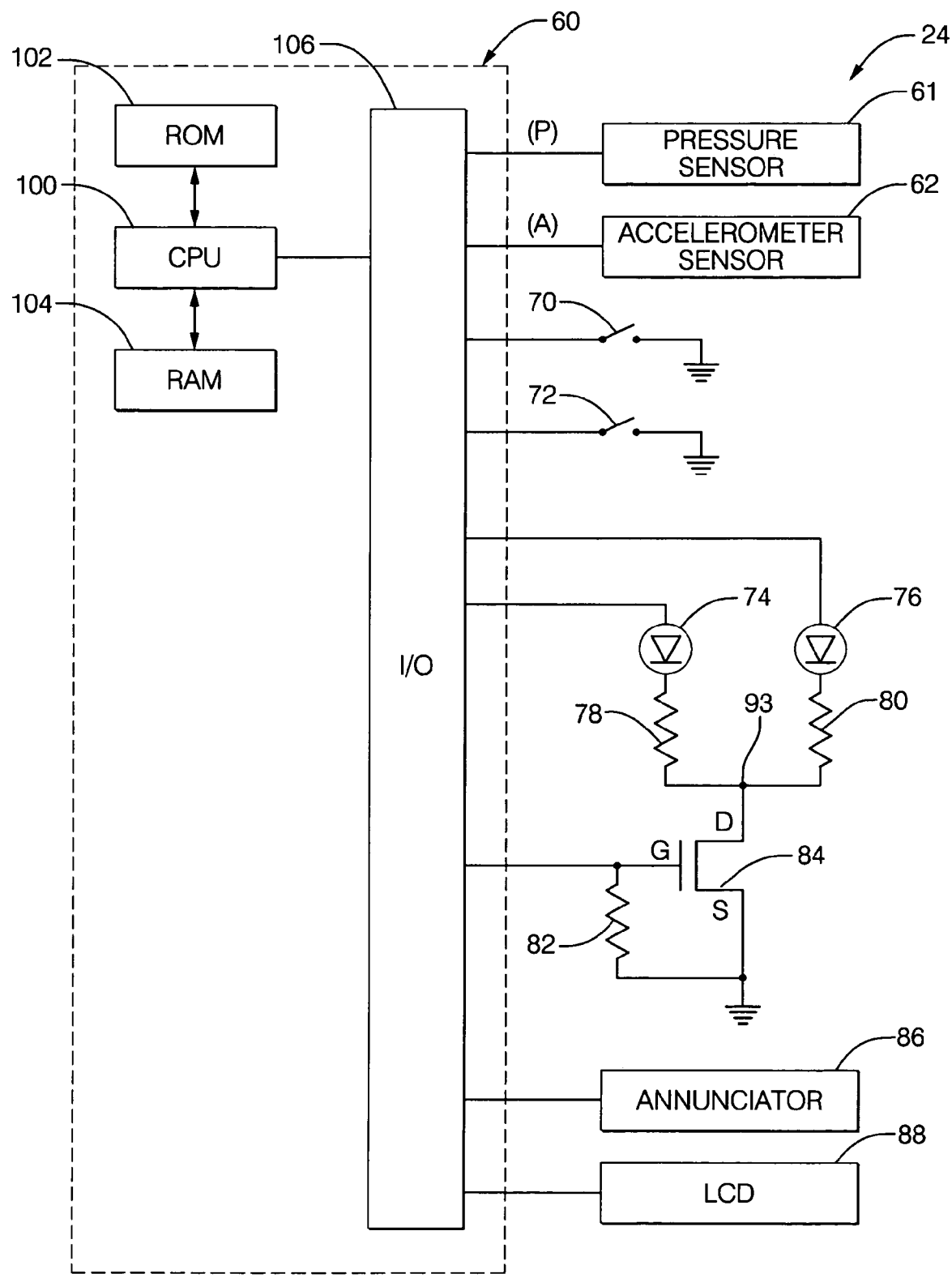
FIG. 4 is an electrical schematic of a child seat position monitoring system utilized in the child restraint system of FIG. 1.

Referring to FIGS. 1 and 4, a child restraint system 10 that can be secured to a vehicle seat 12 in accordance with exemplary embodiment is provided. In particular, the child restraint system 10 is secured to the vehicle seat 12 utilizing the seat belt webbing 14. The child restraint system 10 includes a child seat 20, a base portion 22, and a child seat position monitoring system 24.

Figure 2:
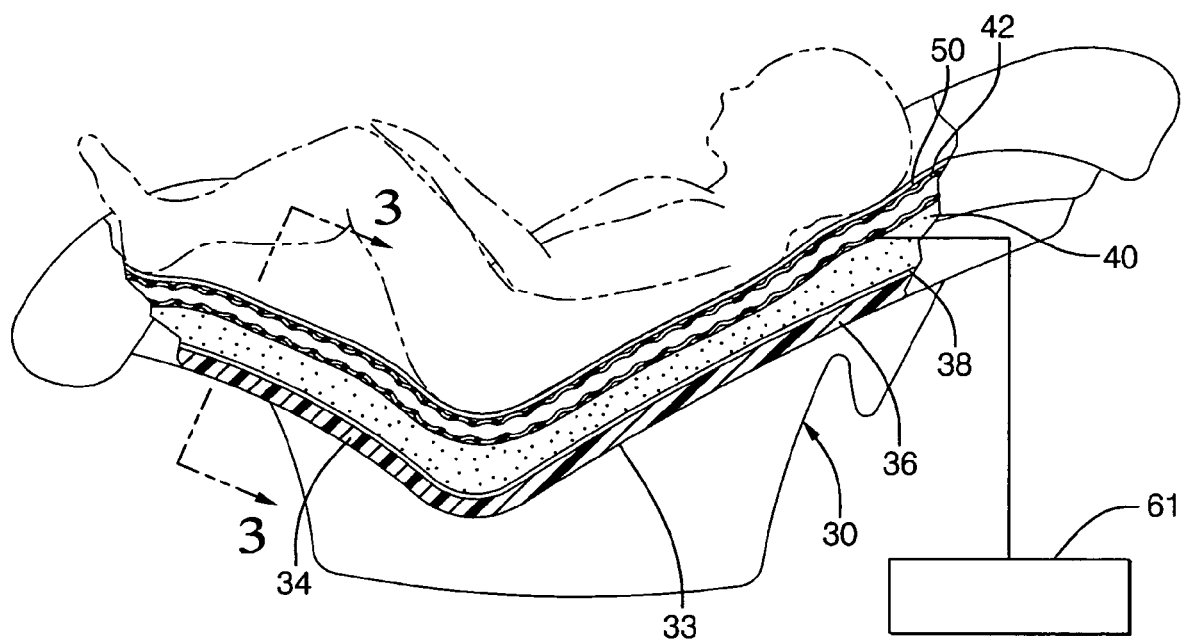
FIG. 2 is a cross-sectional diagram of the child seat in the child restraint system of FIG. 1.
Figure 3:
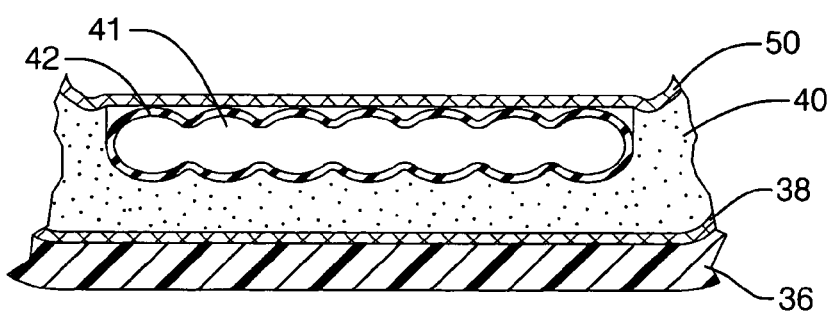
FIG. 3 is a cross-sectional diagram of the child seat of FIG. 2 taken along lines 3-3.

Referring to FIGS. 1 and 2, the child seat 20 comprises a rearward facing child seat that is configured to accommodate a child therein for transporting the child both inside and outside of a vehicle. The child seat 20 is configured to be fixedly secured to the base portion 22 and the base portion 22 is further secured via the seat belt webbing 14 to the seat 12 or to a frame of a vehicle. The child seat 20 includes a shell 30, a handle 49, and a cushion 50.

The shell 30 defines a compartment for accommodating the child therein. The shell 30 includes a back portion 33, a seat portion 34. The back portion 33 supports a back of the child and the seat portion 34 supports the buttocks and legs of the child. The back portion 33 and the seat portion 34 comprise a plastic layer 36, an adhesive layer 38, a polymeric foam layer 40, and a flexible bladder 42. The plastic layer 36 is constructed from a rigid polymeric material. The polymeric foam layer 40 is attached to the plastic layer 36 via the adhesive layer 38. Further, the flexible bladder 42 is disposed adjacent the polymeric foam layer 40. The flexible bladder 42 is constructed from a flexible polymeric material and holds a fluid 41 therein. A pressure sensor 61 is fluidly coupled to the fluid 41 within the flexible bladder 42. When a child is disposed in the child seat 20, a pressure of the fluid 41 within the flexible bladder 42 is indicative of a weight of the child. Accordingly, a signal generated by the pressure sensor 61 is directly indicative of a pressure of the fluid 41 and indirectly indicative of the weight of the child. The pressure signal (P) from the pressure sensor 61 is utilized by a controller for selecting a predetermined angular range Δθ for desired positioning of the child seat 20, which will be described in greater detail below.

The handle 49 is coupled to shell 30 and is provided to allow a user to easily lift the child seat 20. The handle 49 is constructed from a rigid polymeric material. Further, the seat cushion 50 is configured to the disposed over the flexible bladder 42.

Referring to FIG. 1, the base portion 22 is provided to receive the child seat 20 therein. The base portion 22 has a shell 54 constructed from a rigid polymeric material. The shell 50 includes an aperture 56 extending therethrough for receiving the seat belt webbing 14 therethrough.

Referring to FIG. 4, the child seat position monitoring system 24 is provided to monitor an angular position of the child seat 20 and to provide an indication to a user as to whether an angular position of the child seat 20 is within a predetermined angular range Δθ from an axis. The child seat position monitoring system 24 includes a controller 60, a pressure sensor 61, an accelerometer sensor 62, switches 70, 72, light emitting diodes (LEDs) 74, 76, resistors 78, 80, 82, a transistor 84, an annunciator 86, and a liquid crystal display (LCD) 88.

The controller 60 is provided to monitor an output signal (P) from the pressure sensor 61 to determine a weight of the child occupant in the child seat 20. The controller 60 is further provided to monitor an output signal from the accelerometer sensor 62 to determine an angular position of the child seat 20 relative to an axis. The controller 60 is further provided to control operation of indicator devices including the LEDs 74, 76, the annunciator 86, or the LCD 88, as will be described in greater detail below. The controller 60 includes a central processing unit (CPU) 100, a read-only memory (ROM) 102, a volatile memory such as a random access memory (RAM) 104 and an input/output (I/O) interface 106. The CPU 100 operably communicates with the ROM 102, the RAM 104, and the I/O interface 106. The computer readable media including ROM 102 and RAM 104 may be implemented using any of a number of known memory devices such as PROMs, EPROMs, EEPROMS, flash memory or any other electric, magnetic, optical or combination memory device capable of storing data, some of which represent executable instructions used by the CPU 100.

Figure 5:
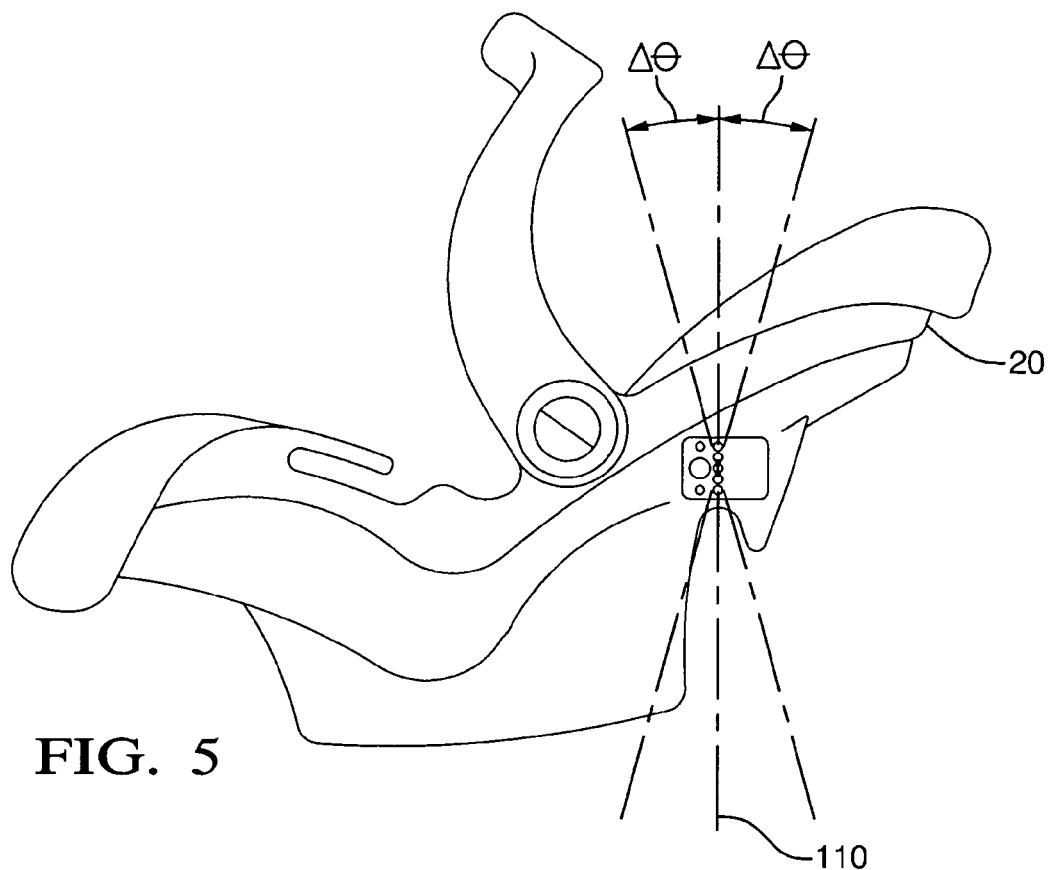
FIG. 5 is a schematic of a child seat that is positioned within a predetermined angular range $\Delta\theta$.
Figure 7:
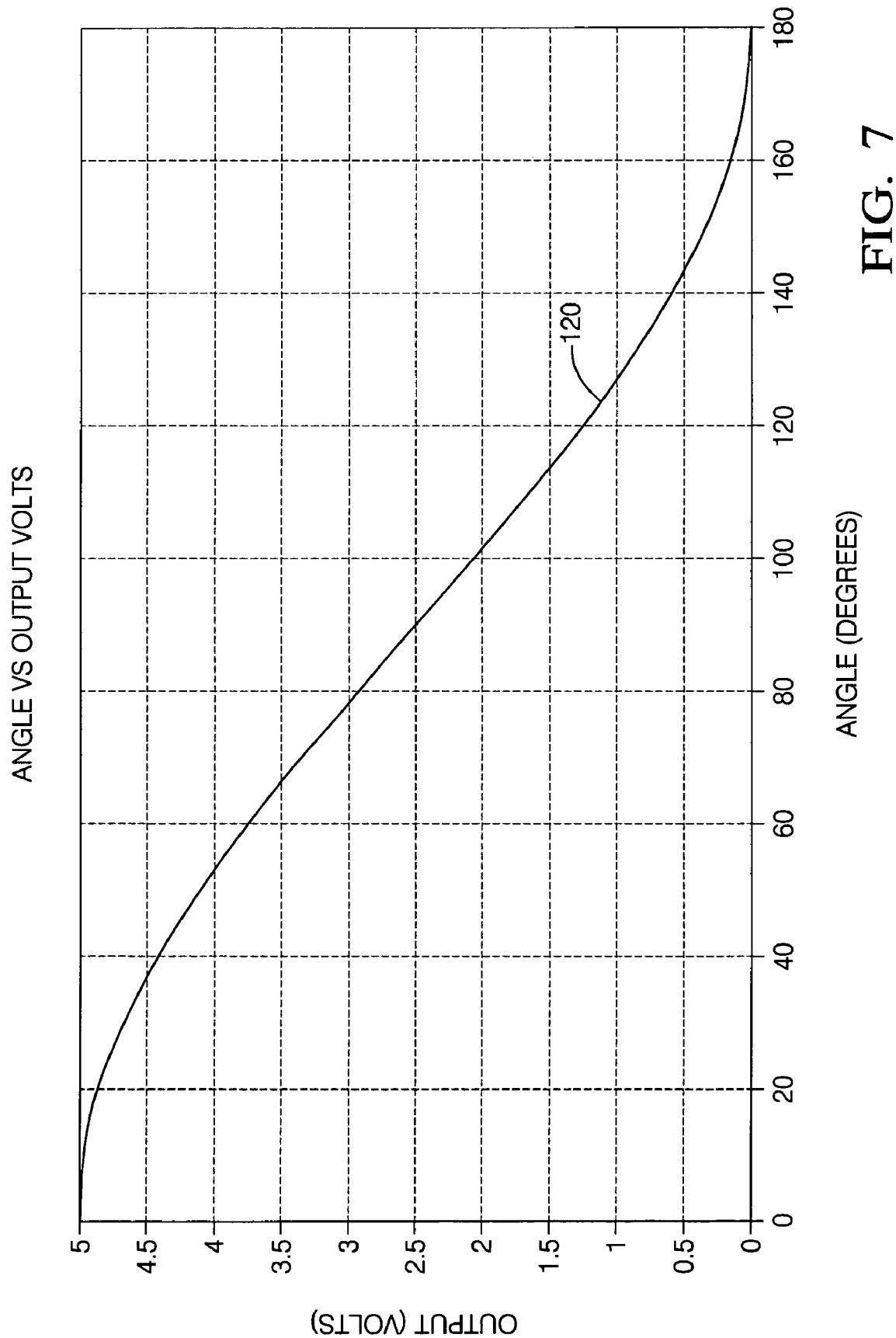
FIG. 7 is a plot of an output signal indicating output voltage versus angular position of an accelerometer sensor utilized in the child seat position monitoring system of FIG. 4.
Figure 12:
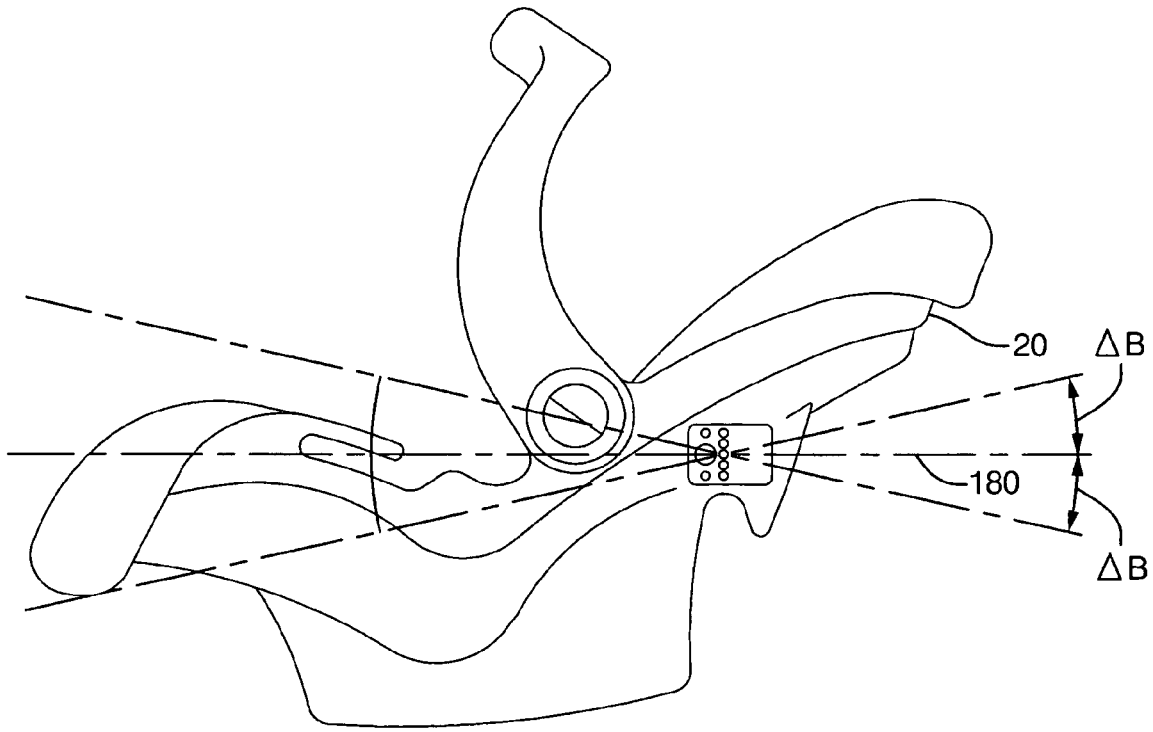
FIG. 12 is a diagram of a child restraint system in accordance with another exemplary embodiment.

The accelerometer sensor 62 is provided to measure an angular position of the child seat 20 with respect to a predetermined axis. Referring to FIG. 5, in one embodiment, the accelerometer sensor 62 comprises a z-axis accelerometer that generates an output signal indicative of an angular displacement of the child seat 20 relative to an axis 110. Referring to FIG. 12, in an alternate embodiment, the accelerometer sensor 62 comprises an x-axis accelerometer that generates an output signal indicative of an angular displacement of the child seat relative to a horizontal axis 180. Referring to FIG. 7, a curve 120 indicates operational characteristics of the accelerometer 62. In particular, the curve 120 indicates that as an angular position of the child seat 20 is moved from 0 degrees (e.g., vertical axis 110 represents 0 degrees) to 180 degrees, the output signal is adjusted from 5 Vdc to 0 Vdc.

It should be noted that in other alternate embodiments, the accelerometer sensor 62 can be replaced with any known sensor that is capable of determining an angular orientation of the seat 20. For example, sensor 62 can be replaced with an inclination sensor or electromechanical sensors or the like that have been utilized in tilt switches and seat belt latching retractors.

In another alternate embodiment, one or more of the sensors in the child seat 20 are operably coupled to one or more radio frequency (RF) transmitters that transmit RF signals having information indicative of the measured parameters, and the child seat monitoring system 24 includes an RF receiver operably coupled to the controller 60 configured to receive the RF signals, to allow wireless communication therebetween.

Referring again to FIG. 4, the remainder of the child seat position monitoring system 24 will now be explained. Both the pressure sensor 61 and the accelerometer sensor 62 are electrically coupled to the I/O interface 106. The switch 70 is electrically coupled between the I/O interface 106 and an electrical ground. When the switch 70 is in a closed operational position, the CPU 100 enters a "training mode" for determining a vertical/reference axis 110 of the child seat 20 based on the output signal (A) from the accelerometer sensor 62. Alternately, when the switch 70 is in an open operational position, the CPU exits the "training mode." The switch 72 is electrically coupled between the I/O interface 106 and the electrical ground. When the switch 72 is in a closed operational position, the CPU 100 enters a "monitoring mode" for determining whether an angular position of the child seat 20 is within a predetermined angular range Δθ from the vertical/reference axis 110. Alternately, when the switch 72 is in an open operational position, the CPU 100 exits the "monitoring mode."

The LED 74 is provided to emit light having a first color to indicate when a measured angular position of the child seat 20 is within a predetermined angular range Δθ from the vertical axis 110. The LED 74 and a resistor 78 are electrically coupled in series between the I/O interface 106 and a node 93. The node 93 is electrically coupled to a drain (D) of a transistor 84. The gate (G) of the transistor 84 is electrically coupled to the I/O interface 106. Further, a resistor 82 is electrically coupled between the gate (G) and electrical ground. When the I/O interface 106 outputs a positive voltage to both the LED 74 and the gate (G) of the transistor 84, the LED 74 emits light having the first color. Alternately, when the I/O interface 106 does not output a positive voltage to both the LED 74 and the gate (G) of the transistor 84, the LED 74 does not emit light.

The LED 76 is provided to emit light having a second color to indicate when a measured angular position of the child seat 20 is outside of the predetermined angular range Δθ from the vertical axis I/O. The LED 76 and a resistor 80 are electrically coupled in series between the I/O interface 106 and the node 93. The node 93 is electrically coupled to a drain (D) of a transistor 84. When the I/O interface 106 outputs a positive voltage to both the LED 76 and the gate (G) of the transistor 84, the LED 76 emits light having the second color. Alternately, when the I/O interface 106 does not output a positive voltage to both the LED 76 and the gate (G) of the transistor 84, the LED 76 does not emit light.

The electrical annunciator 86 is provided to emit a first audible sound when a measured angular position of the child seat 20 is within a predetermined angular range Δθ from the vertical axis 10, in response to a control signal from the controller 60. The electrical annunciator 86 is further provided to emit a second audible sound when the measured angular position of the child seat 20 is outside of a predetermined angular range $\Delta\theta$ from the vertical axis 110, in response to another control signal from the controller 60. The annunciator 86 is electrically coupled to the I/O interface 106.

The LCD 88 is provided to display a first message when a measured angular position of the child seat 20 is within a predetermined angular range $\Delta\theta$ from the vertical axis 110, in response to a control signal from the controller 60. The LCD 88 is further provided to display a second message when a measured angular position of the child seat 20 is outside of a predetermined angular range $\Delta\theta$ from the vertical axis 110, in response to a control signal from the controller 60. The LCD 88 is electrically coupled to the I/O interface 106.

Figure 8:
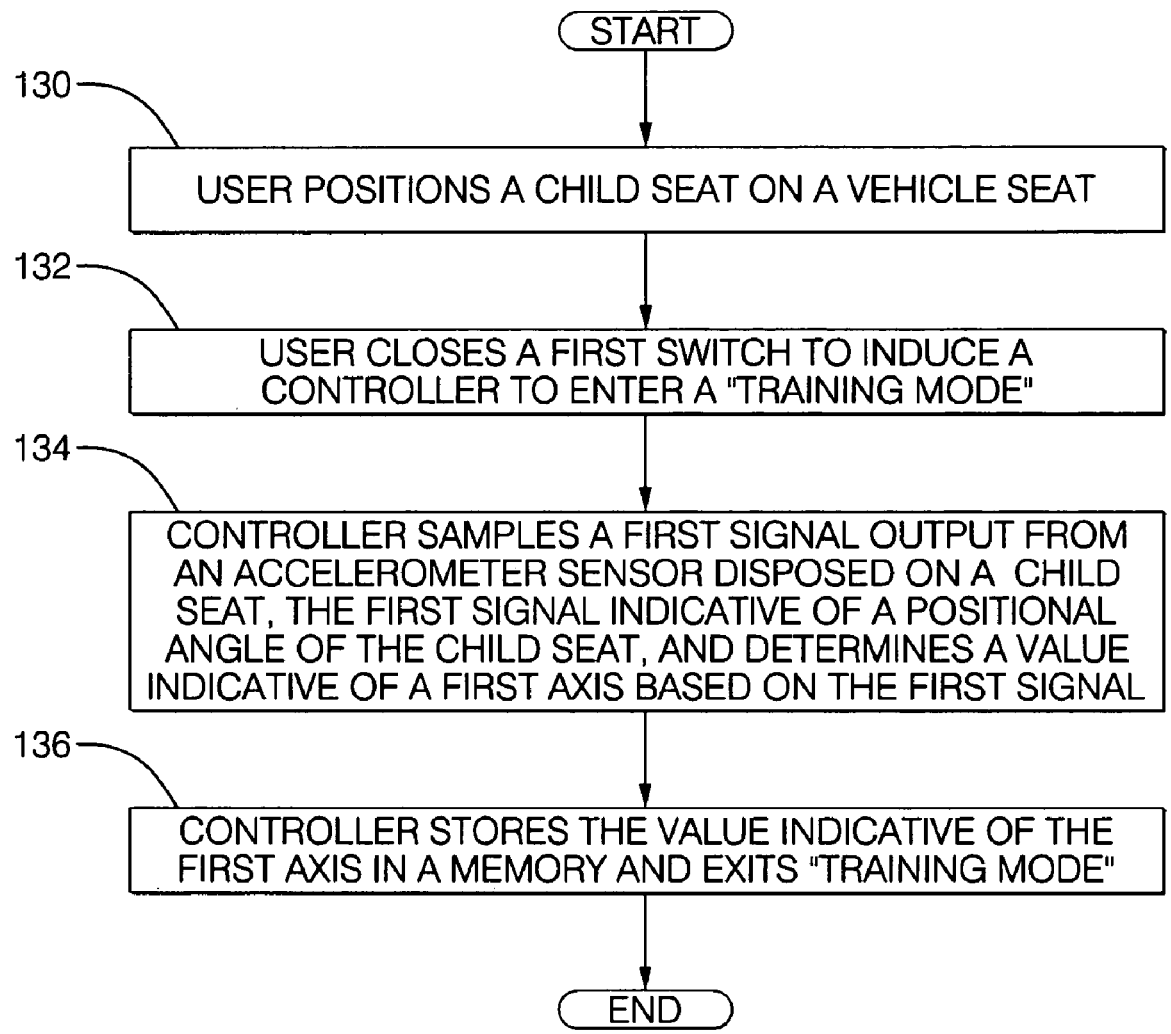
FIGS. 8-11 are flowcharts of a method for training a child seat position monitoring system of FIG. 4.

Referring to FIG. 8, a method for training the controller 60 with a predetermined vertical/reference axis 110 is illustrated. The method can be implemented utilizing software algorithms executed by the controller 60 of the child seat position monitoring system 24.

At step 130, a user positions a child seat 20 on a vehicle seat.

At step 132, the user closes the switch 70 to induce the controller 60 to enter a "training mode."

At step 134, the controller 60 samples a first signal output from the accelerometer sensor 60 disposed on the child seat 20. The first signal is indicative of a positional angle of the child seat 20. Further, the controller 60 determines a value indicative of an axis I/O based on the first signal.

At step 136, the controller 60 stores the value indicative of the axis 100 in a memory and exits "training mode." After step 136, the method is exited.

Figure 9:
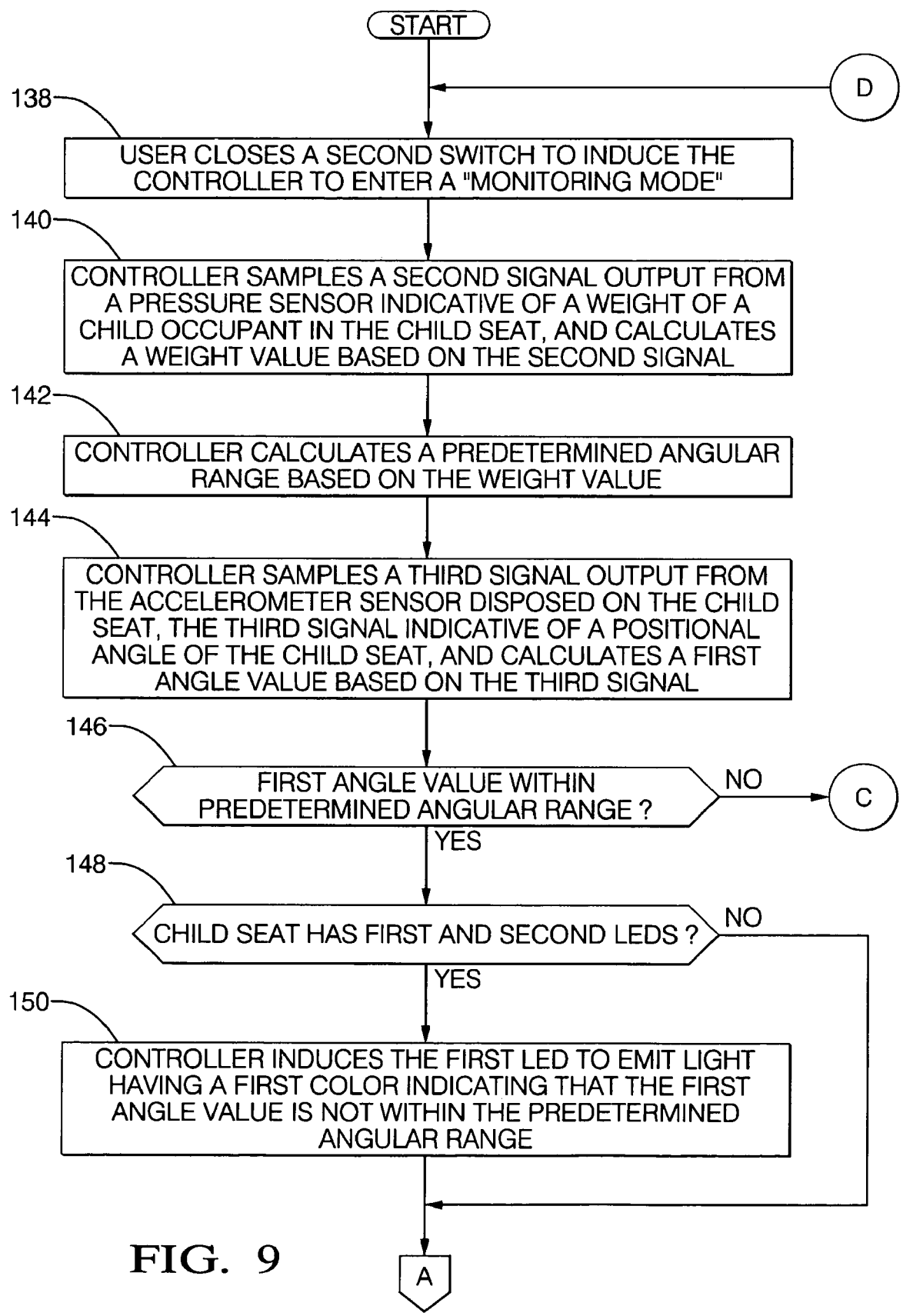
Figure 9:
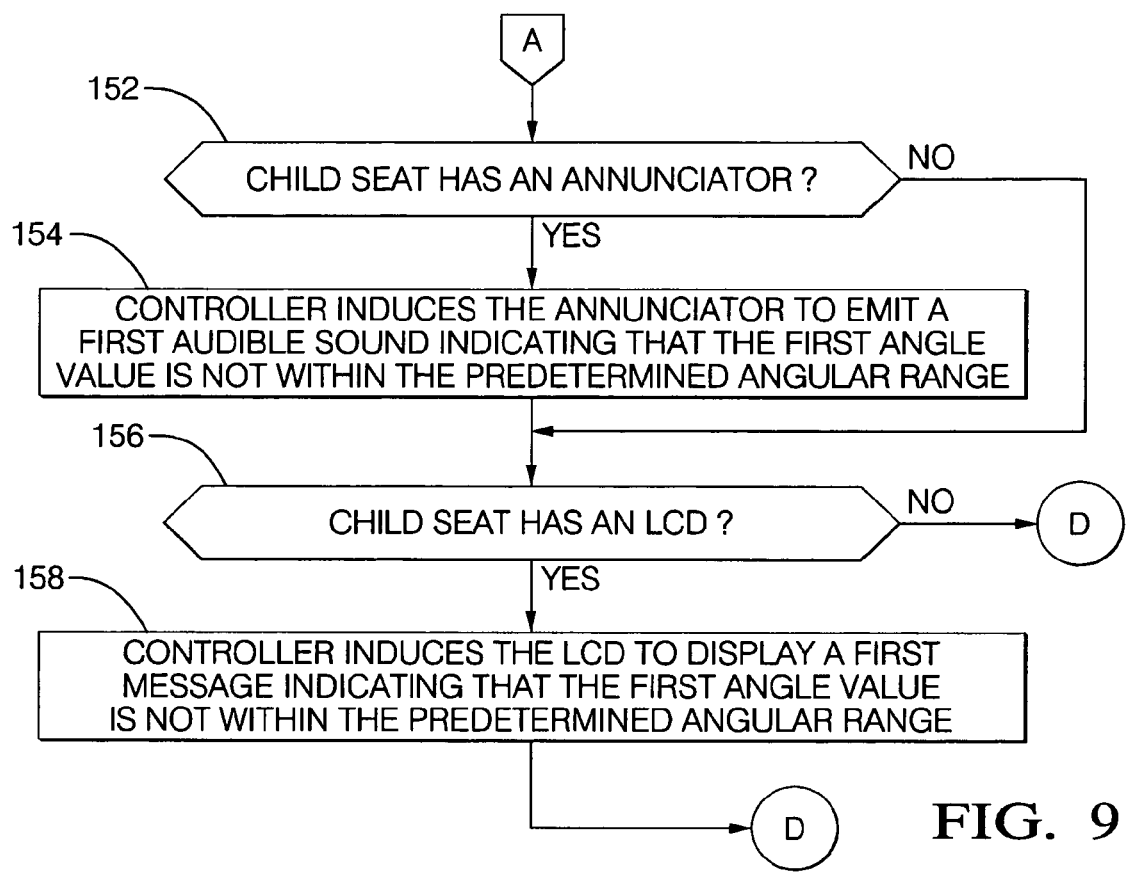
Figure 10:
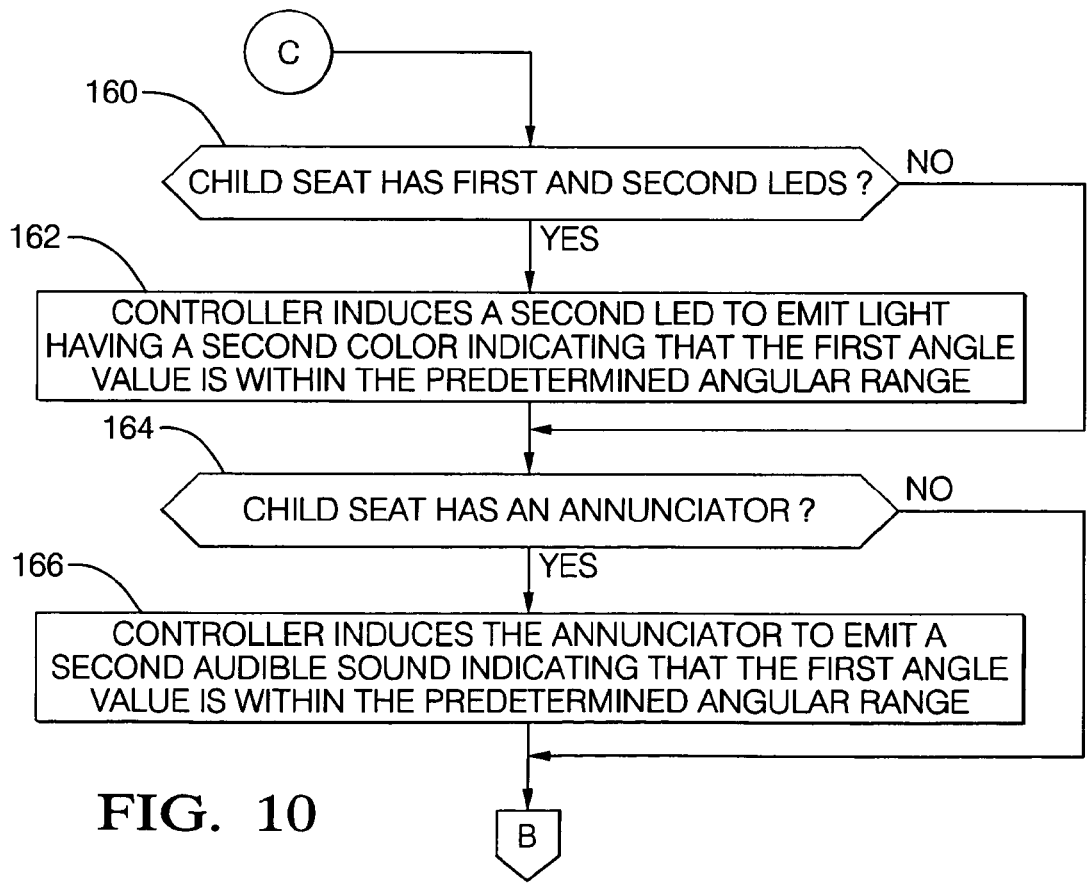
Figure 11:
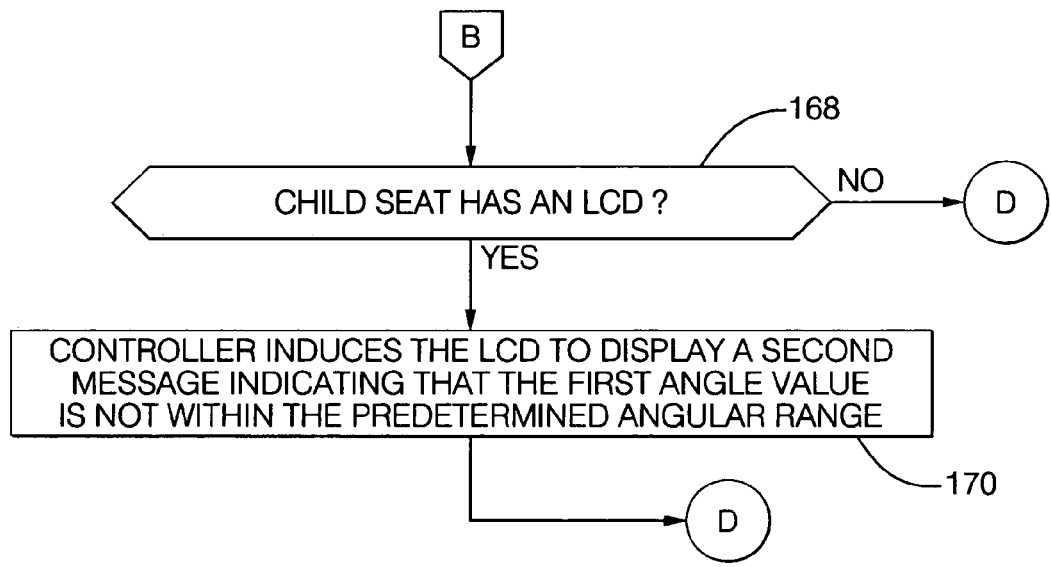

Referring to FIGS. 9-11, a method for monitoring installation of the child restraint system 10 is illustrated. The method can be implemented utilizing software algorithms executed by the controller 60 of the child seat position monitoring system 24.

At step 138, a user closes a switch 72 to induce the controller 60 to enter a "monitoring mode."

At step 140, the controller 60 samples a second signal output from a pressure sensor 61 indicative of a weight of a child occupant in the child seat 20, and calculates a weight value based on the second signal.

At step 142, the controller 60 calculates a predetermined angular range $\Delta\theta$ based on the weight value.

At step 144, the controller 60 samples a third signal from the accelerometer sensor 62 disposed on the child seat 20. The third signal is indicative of positional angle of the child seat 20. Further, the controller 60 calculates a first angle value based on the third signal At step 146, the controller 60 makes a determination as to whether the first angle value is within a predetermined angular range $\Delta\theta$ from the axis 110. If the value of step 146 equals "yes" the method advances to step 148. Otherwise, the method advances step 160.

At step 148, the controller 60 makes a determination as to whether the child seat 20 has LEDs 74, 76. If the value of step 148 equals "yes", the method advances to step 150. Otherwise, the method advances to step 152.

At step 150, the controller 60 induces the LED 74 to emit light having a first color indicating that the first angle value is not within the predetermined angular range $\Delta\theta$. After step 150, the method advances to step 152.

At step 152, the controller 60 makes a determination as to whether the child seat 20 has an electrical annunciator 86. If the value of step 152 equals "yes", the method advances to step 154. Otherwise, the method advances to step 156.

At step 154, the controller 60 induces the annunciator 86 to emit a first audible sound indicating that the first angle value is not within the predetermined angular range $\Delta\theta$. After step 154, the method advances to step 156.

At step 156, the controller 60 makes a determination as to whether the child seat 20 has the LCD 88. If the value of step 156 equals "yes", the method advances to step 158. Otherwise, the method advances to step 138.

Figure 6:
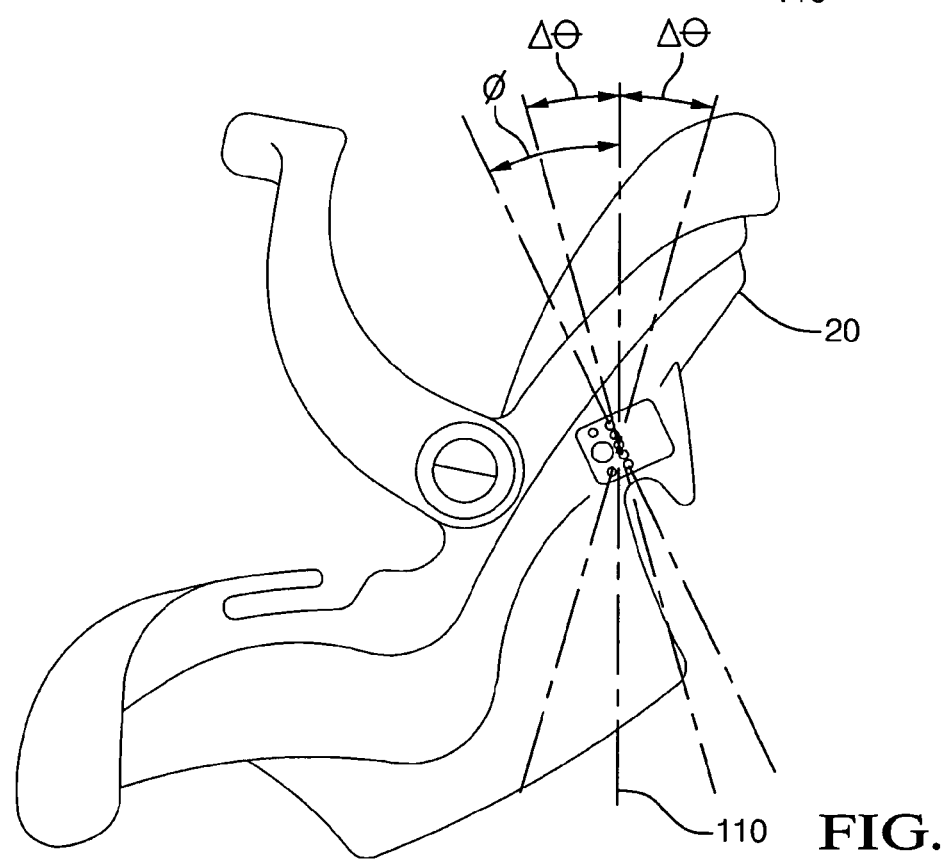
FIG. 6 is a schematic of a child seat that is positioned outside of the predetermined angular range $\Delta\theta$.

At step 158, the controller 60 induces the LCD 88 to display a first message indicating that the first angle value is not within the predetermined angular range $\Delta\theta$. For example, referring to FIG. 6, the first angle value ø is not within the predetermined angular range $\Delta\theta$. Referring to FIG. 9, After step 158, the method advances to step 138.

Referring again to step 146, when the value of step 146 equals "no", the method advances to step 160.

At step 160, the controller 60 makes a determination as to whether the child seat 20 has the LEDs 74, 76. If the value of step 160 equals "yes", the method advances to step 162. Otherwise, the method advances to step 164.

At step 162, the controller 60 induces the LED 76 to emit light having a second color indicating that the first angle value is within the predetermined angular range $\Delta\theta$. After step 162, the method advances to step 164.

At step 164, the controller 60 makes a determination as to whether the child seat 20 has the electrical annunciator 86. If the value of step 164 equals "yes", the method advances to step 166. Otherwise, the method advances to step 168.

At step 166, the controller 60 induces the annunciator 86 to emit a second audible sound indicating that the first angle value is within the predetermined angular range $\Delta\theta$. After step 166, the method advances to step 168.

At step 168, the controller 60 makes a determination as to whether the child seat 20 has the LCD 88. If the value of step 168 equals "yes", the method advances to step 170. Otherwise, the method advances to step 138.

At step 170, the controller 60 induces the LCD 88 to display a second message indicating that the first angle value is within the predetermined angular range $\Delta\theta$. After step 170, the method advances to step 138.

The child restraint system and a method for monitoring installation of the child restraint system provide a substantial advantage over other systems and methods. In particular, the child restraint system utilizes a controller to monitor an angular position of the child seat and to provide an indication to a user as to whether an angular position of the child seat is within a predetermined angular range from an axis.

As described above, the method for monitoring installation of the child restraint system can be embodied in the form of computer-implemented processes and apparatuses for practicing those processes. In an exemplary embodiment, the method is embodied in computer program code executed by one or more elements. The present method may be embodied in the form of computer program code containing instructions embodied in tangible media, such as floppy diskettes, CD-ROMs, hard drives, flash memory, or any other computer-readable storage medium, wherein, when the computer program code is loaded into and executed by a computer, the computer becomes an apparatus for practicing the invention. The present method can also be embodied in the form of computer program code, for example, whether stored in a storage medium, loaded into and/or executed by a computer.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A child restraint system adapted to be mounted within a vehicle, the child restraint system comprising:
   a child seat configured to receive a child occupant, the child seat further configured to be removably secured to a vehicle seat;
   a first sensor coupled to the child seat, the first sensor configured to output a first signal indicative of positional angle of the child seat relative to a first axis; and
   a controller coupled to the child seat configured to receive the first signal and to calculate a first angle value based on the first signal, the controller further configured to induce a first device disposed on the child seat to indicate visually or audibly when the first angle value is not within a predetermined angular range from the first axis.

2. The child restraint system of claim 1, wherein the first sensor comprises a z-axis accelerometer sensor configured to adjust an amplitude of the first signal based on an angular position of the child seat.

3. The child restraint system of claim 1, wherein the first sensor comprises an x-axis accelerometer sensor configured to adjust an amplitude of the first signal based on an angular position of the child seat.

4. The child restraint system of claim 1, further comprising a second sensor configured to output a second signal indicative of the weight of child occupant, the controller further configured to receive the second signal and to calculate the predetermined angular range value based on the second signal.

5. The child restraint system of claim 1, wherein the second sensor comprises a pressure sensor disposed on the child seat.

6. The child restraint system of claim 1, wherein the first device comprises a light-emitting diode, the controller configured to induce the light-emitting diode to emit light having a first color when the first angle value is not within the predetermined angular range.

7. The child restraint system of claim 1, wherein the first device comprises an electrical annunciator, the controller configured to induce the electrical annunciator to emit a first audible sound when the first angle value is not within the predetermined angular range, the controller further configured to induce the electrical annunciator to emit a second audible sound when the first angie value is within the predetermined angular range.

8. The child restraint system of claim 1, wherein the first device comprises a liquid-crystal display, the controller configured to induce the liquid-crystal display to display a first message when the first angle value is not within the predetermined angular range, the controller further configured to induce the liquid-crystal display to display a second message when the first angle value is within the predetermined angular range.

9. The child restraint system of claim 1, wherein the controller is further configured to induce a second device to indicate when the first angle value is within the predetermined angular range.

10. The child restraint system of claim 9, wherein the second device comprises a light-emitting diode, the controller further configured to induce the light-emitting diode to emit light having a first color when the first angle value is within the predetermined angular range.

11. The child restraint system of claim 1, wherein the child seat comprises a rearward-facing child seat with respect to the vehicle seat.

12. The child restraint system of claim 1, wherein the child seat comprises a frontward-facing child seat with respect to the vehicle seat.

13. A method for monitoring installation of a child restraint system on a vehicle seat, the child restraint system having a child seat configured to receive a child occupant, the method comprising:
   outputting a first signal from a first sensor disposed on the child seat, the first signal indicative of a positional angle of the child seat relative to a first axis, the child seat configured to be removably secured to the vehicle seat;
   calculating a first angle value based on the first signal utilizing a controller; and
   inducing a first device disposed on the child seat to indicate visually or audibly when the first angle value is not within a predetermined angular range from the first axis.

14. The method of claim 13, further comprising:
   outputting a second signal from a second sensor disposed on the child seat, the second signal indicative of a weight of the child occupant; and
   calculating the predetermined angular range based on the second signal utilizing the controller.

15. The method of claim 13, further comprising:
   positioning the child seat on a vehicle seat; and
   outputting a second signal from the first sensor disposed on the child seat; and
   determining the first axis based on the second signal.

16. The method of claim 13, wherein the first device comprises a light-emitting diode, and the step of inducing the first device disposed on the child seat to indicate when the first angle value is not within the predetermined angular range comprises inducing the light-emitting diode to emit light having a first color when the first angle value is not within the predetermined angular range.

17. The method of claim 13, wherein the first device comprises an electrical annunciator, and the step inducing the first device disposed on the child seat to indicate when the first angle value is not within the predetermined angular range comprises inducing the electrical annunciator to emit a first audible sound when the first angle value is not within the predetermined angular range.

18. The method of claim 13, wherein the first device comprises a liquid-crystal display, and the step of inducing the first device to indicate when the first angle value is not within the predetermined angular range comprises inducing the liquid-crystal display to display a first message when the first angle value is not within the predetermined angular range.

19. The method of claim 13, further comprising inducing a second device to indicate when the first angle value is within the predetermined angular range.

20. The method of claim 19, wherein the second device comprises a light-emitting diode, and the step of inducing the second device to indicate when the first angle value is within the predetermined angular range, comprises inducing the light-emitting diode to emit light having a first color when the first angle value is within the predetermined angular range.

21. A child restraint system adapted to be mounted within a vehicle, the child restraint system comprising:
- a unitary child seat configured to receive a child occupant, the unitary child seat further configured to be removably secured to a vehicle seat;
- a first sensor coupled to the unitary child seat, the first sensor configured to output a first signal indicative of positional angle of the unitary child seat relative to a first axis; and
- a controller coupled to the unitary child seat configured to receive the first signal and to calculate a first angle value based on the first signal, the controller further configured to induce a first device disposed on the unitary child seat to indicate visually or audibly when the first angle value is not within a predetermined angular range from the first axis.

22. A child restraint system adapted to be mounted within a vehicle, the child restraint system comprising:
- a child seat configured to receive a child occupant, the child seat further configured to be removably secured to a vehicle seat;
- a first sensor coupled to the child seat, the first sensor configured to output a first signal indicative of positional angle of the child seat relative to a first axis; and
- a controller coupled to the child seat configured to receive the first signal and to calculate a first angle value based on the first signal, the controller further configured to induce a light emitting diode disposed on the child seat to emit light to indicate when the first angle value is not within a predetermined angular range from the first axis.

23. A child restraint system adapted to be mounted within a vehicle, the child restraint system comprising:
- a child scat configured to receive a child occupant, the child seat further configured to be removably secured to a vehicle seat;
- a first sensor coupled to the child scat, the first sensor configured to output a first signal indicative of positional angle of the child seat relative to a first axis; and
- a controller coupled to the child seat configured to receive the first signal and to calculate a first angle value based on the first signal, the controller further configured to induce an electrical enunciator disposed on the child seat to emit sound to indicate when the first angle value is not within a predetermined angular range from the first axis.

24. A child restraint system adapted to be mounted within a vehicle, the child restraint system comprising:
- a child seat configured to receive a child occupant, the child seat further configured to be removably secured to a vehicle seat;
- a first sensor coupled to the child seat, the first sensor configured to output a first signal indicative of positional angle of the child seat relative to a first axis; and
- a controller coupled to the child seat configured to receive the first signal and to calculate a first angle value based on the first signal, the controller further configured to induce an liquid-crystal display disposed on the child seat to display a first message to indicate when the first angle value is not within a predetermined angular range from the first axis.

* * * * *